May 27, 1969
W. SCHMIDT
3,446,951
ARRANGEMENT FOR VARYING THE FOCUS OF
A FLASH LAMP IN PHOTOGRAPHIC
ELECTRONIC FLASH UNITS
Filed Dec. 20, 1965
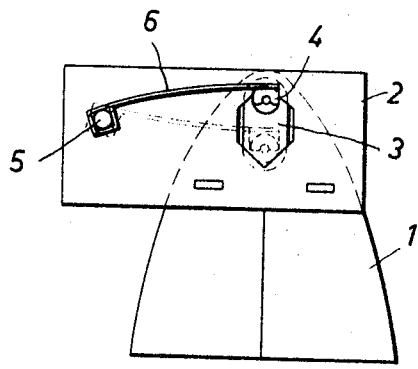
Fig.1
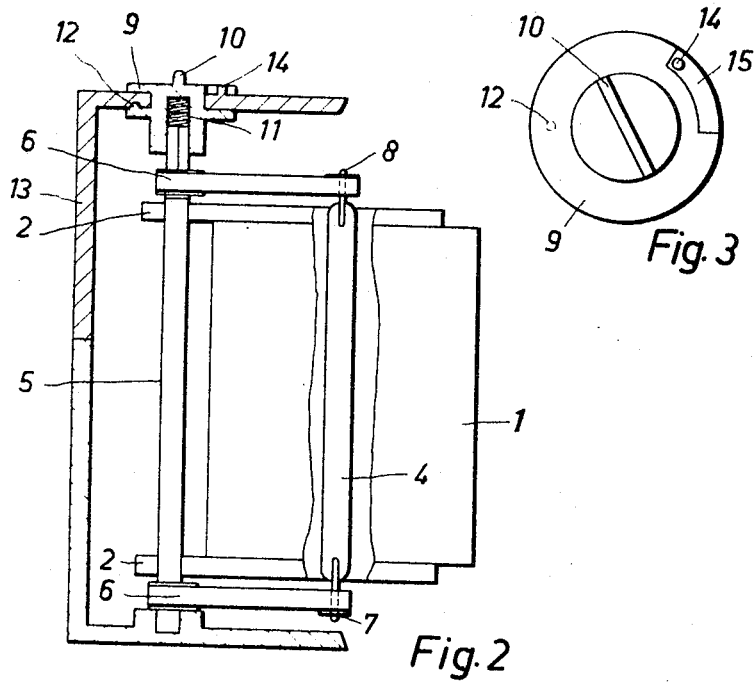
Fig.2
Fig.3
Inventor:

United States Patent Office 3,446,951
Patented May 27, 1969

3,446,951
ARRANGEMENT FOR VARYING THE FOCUS OF A FLASH LAMP IN PHOTOGRAPHIC ELECTRONIC FLASH UNITS
Walter Schmidt, Berlin, Germany, assignor to Loewe Opta GmbH, Berlin, Germany, a company of Germany
Filed Dec. 20, 1965, Ser. No. 515,805
Claims priority, application Germany, Dec. 22, 1964, L 38,655
Int. Cl. G03b 15/035
U.S. Cl. 240—1.3                                6 Claims

ABSTRACT OF THE DISCLOSURE

An electronic flash unit for photographic purposes has two opposite side pieces. A reflector is held between the side pieces. A two-ended flash lamp extends across the reflector and one end extends through a hexagonal aperture in each of the side pieces. A leaf spring is attached to each end of the flash lamp, and the opposite ends of the leaf springs are attached to an adjusting mechanism such that the leaf springs may be rotated to selectively and resiliently hold the flash lamp in either end of the hexagonal apertures to vary the focus.

---

The invention relates to an arrangement for varying the focus of a flash lamp in the reflector of an electronic flash unit for photographic purposes and aims at an advantageous construction of such an arrangement with particular respect to the secure position of such variable flash lamp.

It is known that the arrangements for varying the focus of flash lamps in photographic flash units have the aim of allowing the angle of illumination in taking the photograph so to be varied that photographs can be made with a normal illumination angle or with wide angle illumination.

Furthermore it is already known from U.S. Patent No. 2,906,862 to vary the position of a flash lamp for photographic purposes within the reflector for focusing the apparatus by means of a screw threaded member, said flash lamp being simultaneously suspended in the reflector by a plurality of resilient electrical conductors.

Another focusing means is described in U.S. Patent No. 3,226,536 for floodlights in which the light beam can be controlled to provide desired beam shapes. The adjustable focusing of this arrangement is performed by means of a special mechanism consisting of a pair of substantially triangular mounting plates pivotally mounted at their apices to the light house and carrying the lamp socket. Here rotation of said mounting plates and thereby shifting of the lamp itself is realized by means of a pinion which may be rotated by a knob from outside and engages a gear element on said mounting plates.

These known arrangments are different from the object of the present invention in its structure and are relatively complicated.

The present invention is concerned with an improved electronic flash unit for photographic purposes, wherein the flash lamp is shiftably arranged too, however, the means for shifting the lamp in order to vary the position of the flash lamp within the reflector are of most simple structure in comparison to said above cited known arrangements.

In the arrangement in accordance with the invention the bearing means for supporting the ends of the flash lamp consist of two side elements holding the reflector and bearing the ends of the flash lamp, said side elements being each supplied with an aperture of hexagonal shape, into the two acute angles of which either end of said flash lamp is selectively shifted by said elastic holding means from one end position to the other end position, both laying on the central axis of the reflector, thus said flash lamp being adapted to be movable from one position into the other along this axis by rotating the operating element.

The shifting of the flash lamp within the aperture of hexagonal shape from one position into the other is performed in accordance with the present invention merely by means of a pair of leaf springs which are swivelled from one end position into the other end position by rotating the operating element, and further the two electrodes of the flash lamp are each fastened to the end of one of said leaf springs whose other ends are fastened to the operating element, e.g., setting lever or knob, so that when this element is turned the leaf springs are shifted from their position to the second of two possible positions, thus pressing the flash lamp from one end position into the other within the above mentioned aperture of hexagonal shape provided in the side elements holding the reflector and bearing the ends of the flash lamp.

It is of advantage here to provide a greater swivelling angle for the wearing element than the possible swivelling path of the flash lamp within the aperture of hexagonal shape. This ensures a firm position of the flash lamp in both positions.

The two positions of the operating element can also be fixed by catches or stops.

In order to go beyond this and secure an exactly defined position of the flash lamp axis, the invention provides that the axis of the varying element be laid on the mid-vertical of the line connecting the two end positions of the flash lamp.

The invention is now explained by way of an exemplary embodiment shown in the accompanying drawings, wherein FIG. 1 shows a side view of the reflector with the operating elements, FIG. 2 a view of the reflector with the operating element from above, partly in section, and FIG. 3 a view of the setting knob from the front, enlarged.

As FIG. 1 shows, reflector 1 bears side elements 2 with apertures 3. These apertures 3 are hexagonal in shape, and the flash lamp 4 lies with its two ends in the acute angles of this aperture. The operating element for selectively shifting the flash lamp 4 into the two positions, i.e. the end positions of flash lamp 4, which are shown drawn out and marked with a broken line, has an axis 5, to which the left end of spring 6 is fastened; the right end of each spring 6 is held at the respective end of the flash lamp. It will be seen that when the varying axis 5 is turned clockwise, spring 6 is shifted into the broken line end position pressing flash lamp 4 downward into a position also indicated by broken lines.

The swivelling path of the flash lamp within aperture 3 is therefore exactly limited by the hexagonal shape of the aperture 3 within the side and holding elements 2. To ensure a film position of lamp 4 in the two end positions it is preferable to make the swivelling path smaller than the swivelling angle of varying axis 5, which must be fixed by stops or catches.

This fixing of the turn of the varying axis can be seen in FIG. 2. This figure shows a view of the reflector with the operating element for the flash lamp from above, partly in section. It is clearly seen that reflector 1 is suspended on both sides by the side portions 2 on axis 5 of the varying arrangement. The two springs 6 of the operating element, which serve for holding the electrodes 7 and 8 of flash lamp 4 are fastened to the respective quadrilateral ends of axis 5. To turn varying axis 5 there is setting knob 9, which has a projecting crossbar 10 for the operator to grip in turning. Axis 5 itself is supported elastically by a helical spring 11 inside this knob. A catch 12 is provided to lock the position of this setting knob 9, engaging in a corresponding depression of the casing wall 13 of the flash unit. Further a pin 14 serves as a stop to limit the turn of this setting knob 9.

The action of stop pin 14 and of catch 12 is clearly perceptible from FIG. 3. The upper part of setting knob 9 has a depression 15, within which the stop pin can be moved; thus two positions of this knob 9 are set.

Supplementarily to FIGS. 1 and 2 it is added that springs 6 of the operating element at the same time serve as electric conductors.

The invention therefore enables the flash lamp to be placed in two exactly defined end positions. The combined action of the elastic holding arrangement with the suspension of the flash lamp in the hexagonal aperture provides two definite end positions of this flash lamp. The flash lamp can be shifted by elastic pressure into its two end positions, whereby tolerances between the reflector and the casing portions holding the bearings of the varying axis are not transmitted to the position of the flash lamp in the reflector. Thus in the simplest way a change-over can be effected from a normal illumination angle to wide-angle illumination.

What is claimed is:

1. In an electronic flash unit for photographic purposes a reflector, a flash lamp, bearing means for supporting the ends of said flash lamp, elastic holding means for said flash lamp, and means for varying the position of said flash lamp located at either end of said flash lamp and movble from outside by means of an operating element, said bearing means for supporting the ends of said flash lamp consisting of two side elements holding said reflector and bearing the ends of said flash lamp, said side elements being each supplied with an aperture of hexagonal shape into the two acute angles of which either end of said flash lamp is selectively shifted by said elastic holding means from one end position to the other end position both laying on the central axis of said reflector, thus said flash lamp being adapted to be movable from one position into the other along this axis by rotating said operating element.

2. Electronic flash unit as claimed in claim 1, wherein the axis of said operating element to which the opposite ends of said elastic holding means not touching said flash lamp are attached, is laid on the mid-vertical of the line connecting the two positions of said flash lamp.

3. Electronic flash unit as claimed in claim 1, wherein said operating element is rotatable within the range of a definite swivelling angle which is greater than the swivelling path of the flash lamp.

4. Electronic flash unit as claimed in claim 1, wherein the setting of said operating element is locked by stops.

5. Electronic flash unit as claimed in claim 1, wherein the setting of said operating element is locked by catches.

6. Electronic flash unit as claimed in claim 1, wherein said elastic holding means serve as electric conductors.

References Cited

UNITED STATES PATENTS

| 1,689,918 | 10/1928 | Godley | 240—44.2 |
| 2,906,862 | 9/1959 | McCammon | 240—1.3 |
| 3,226,536 | 12/1965 | Atkin et al. | 240—44.2 |

NORTON ANSHER, *Primary Examiner.*

M. H. HAYES, *Assistant Examiner.*

U.S. Cl. X.R.

240—44.2